US010331586B2

(12) United States Patent
Seo

(10) Patent No.: US 10,331,586 B2
(45) Date of Patent: Jun. 25, 2019

(54) NONVOLATILE MEMORY DEVICE FOR PROVIDING FAST BOOTING AND SYSTEM INCLUDING THE SAME

(71) Applicant: Samsung Electronics Co., Ltd., Suwon-si, Gyeonggi-do (KR)

(72) Inventor: Sung-yong Seo, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 54 days.

(21) Appl. No.: 15/287,867

(22) Filed: Oct. 7, 2016

(65) Prior Publication Data

US 2017/0123814 A1 May 4, 2017

(30) Foreign Application Priority Data

Oct. 30, 2015 (KR) .................. 10-2015-0152534
Feb. 29, 2016 (KR) .................. 10-2016-0024712

(51) Int. Cl.
*G06F 9/00* (2006.01)
*G06F 13/16* (2006.01)
*G06F 3/06* (2006.01)
*G06F 9/4401* (2018.01)

(52) U.S. Cl.
CPC ........ *G06F 13/1673* (2013.01); *G06F 3/0611* (2013.01); *G06F 3/0647* (2013.01); *G06F 3/0656* (2013.01); *G06F 3/0685* (2013.01); *G06F 9/4401* (2013.01)

(58) Field of Classification Search
CPC .............................. G06F 3/0656; G06F 9/4401
See application file for complete search history.

(56) References Cited

U.S. PATENT DOCUMENTS

| | | | |
|---|---|---|---|
| 5,535,357 A | 7/1996 | Moran et al. | |
| 5,794,054 A | 8/1998 | Le et al. | |
| 6,182,187 B1 | 1/2001 | Cox et al. | |
| 6,456,517 B2 | 9/2002 | Kim et al. | |
| 6,564,285 B1 | 5/2003 | Mills et al. | |
| 6,601,167 B1 | 7/2003 | Gibson et al. | |
| 6,928,512 B2 | 8/2005 | Ayukawa et al. | |
| 7,234,052 B2 | 6/2007 | Lee et al. | |
| 7,716,411 B2 | 5/2010 | Panabaker et al. | |
| 7,752,380 B2 | 7/2010 | Avraham et al. | |
| 2003/0035431 A1* | 2/2003 | Guse ................... | H04L 49/25 370/401 |
| 2004/0017708 A1* | 1/2004 | Choi .................... | G06F 9/4401 365/200 |
| 2005/0204091 A1 | 9/2005 | Kilbuck et al. | |
| 2007/0186061 A1* | 8/2007 | Oh ..................... | G06F 13/1694 711/154 |
| 2014/0223262 A1* | 8/2014 | Takefman ............ | H03M 13/05 714/768 |
| 2014/0237176 A1 | 8/2014 | Takefman et al. | |
| 2015/0106548 A1 | 4/2015 | Dubois et al. | |

(Continued)

*Primary Examiner* — Zachary K Huson
(74) *Attorney, Agent, or Firm* — Harness, Dickey & Pierce, P.L.C.

(57) ABSTRACT

Provided are a memory device providing fast booting and a memory system including the same. The memory device may include a nonvolatile first memory that stores boot data; a buffer that provides the boot data to a host via a volatile memory interface; and a controller that controls transmission of the boot data from the first memory to the buffer in response to a command from the host.

16 Claims, 14 Drawing Sheets

(56) References Cited

U.S. PATENT DOCUMENTS

2016/0188523 A1* 6/2016 Teoh ................. G06F 13/28
                                                710/105
2016/0232112 A1* 8/2016 Lee .................. G06F 13/1673

\* cited by examiner

NONVOLATILE MEMORY DEVICE FOR PROVIDING FAST BOOTING AND SYSTEM INCLUDING THE SAME

CROSS-REFERENCE TO RELATED APPLICATIONS

This application claims the benefit of Korean Patent Application No. 10-2015-0152534, filed on Oct. 30, 2015, and Korean Patent Application No. 10-2016-0024712, filed on Feb. 29, 2016, in the Korean Intellectual Property Office, the disclosures of which are incorporated herein in their entireties by reference.

BACKGROUND

Example embodiments of the inventive concepts relate to a memory device and a memory system including the same, and more particularly, to a memory device providing fast booting and a memory system including the same.

Conventionally, a separate storage interface may be used in order to obtain data required for booting during a boot process for booting a host. In such a case, when the boot process is initiated, data required for booting is read out from the separate storage interface. Here, a memory space may be used to store codes for a host to control the corresponding storage interface and a time period may be required for executing the codes. Therefore, continuous efforts have been made to reduce the booting time.

SUMMARY

Example embodiments of the inventive concepts provide a non-volatile memory device, a system including the same, and/or a method of operating the same. For example, at least some example embodiments relate to a non-volatile memory device providing fast booting, a system including the same, and/or a method of operating the same.

According to another example embodiment of the inventive concepts, there is provided a memory module including at least one nonvolatile memory; and a memory device, where the memory device includes a buffer that provides a same interface as that of the volatile memory; a volatile first memory that stores boot data; and a controller that controls transmission of the boot data from the first memory to the buffer.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
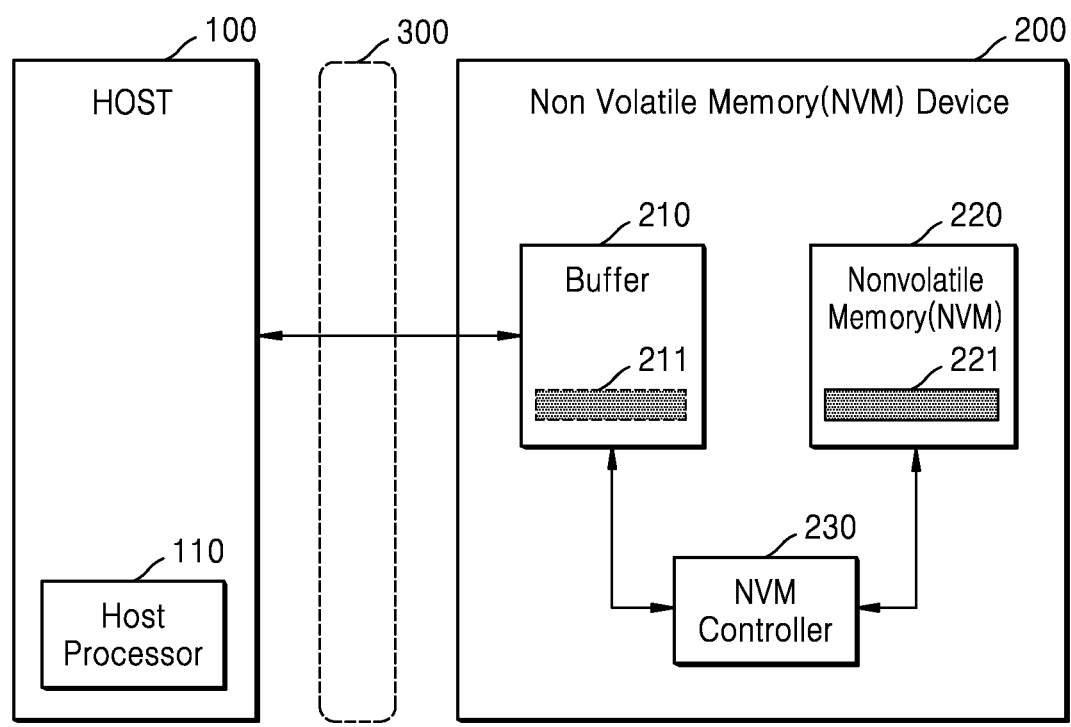
FIG. 1 is a block diagram showing a host and a non-volatile memory device, according to an example embodiment.

FIG. 1 is a block diagram showing a host 100, a non-volatile memory device 200, and a memory interface 300, according to an embodiment.

As shown in FIG. 1, the host 100 may include a host processor 110, and the non-volatile memory device 200 may include a buffer 210, a non-volatile memory 220, and a non-volatile memory controller 230.

The non-volatile memory controller 230 may be implemented by at least one semiconductor chip disposed on a printed circuit board. The semiconductor chip may be an arithmetic logic unit, a digital signal processor, a microcomputer, a field programmable array, a programmable logic unit, a microprocessor or any other device capable of responding to and executing instructions in a defined manner. The non-volatile memory controller 230 may execute instructions that configure the non-volatile memory controller 230 as a special purpose processor to load boot data from the non-volatile memory 220 to the buffer 210 based on a command from the host 100. The non-volatile memory controller 230 may improve the function of the system itself by allowing the host processor 110 to read out the boot data 211 from the buffer 210 at high speed, and thus a time taken to perform a boot process may be reduced.

Likewise, the host processor 110 may be implemented by at least one semiconductor chip disposed on a printed circuit board. The semiconductor chip may be an arithmetic logic unit, a digital signal processor, a microcomputer, a field programmable array, a programmable logic unit, a microprocessor or any other device capable of responding to and executing instructions in a defined manner. The host processor 110 may execute instructions that configure the host processor 110 as a special purpose processor to load the boot data from the non-volatile memory device 200, and use the loaded boot data to boot the host 100.

A memory interface 300, via which the host 100 and the non-volatile memory device 200 communicate with each other, may be an interface of a memory device (or a memory system or a memory module) that does not include a non-volatile memory (e.g., an interface of a volatile memory device). For example, the host processor 110 may transmit a command to the buffer 210 using a memory controller (not shown) included in the host 100 that is connected to the memory interface 300, and the buffer 210 may perform a task in response to the received command. Furthermore, the non-volatile memory controller 230 may control the buffer 210 and the non-volatile memory 220 based on the received command, where the buffer 210 and the non-volatile memory 220 may perform tasks under the control of the non-volatile memory controller 230.

The buffer 210 is a component capable of exchanging commands and data with the host 100, and the buffer 210 may support the memory interface 300. The memory interface 300 may be a volatile memory interface. More particularly, the memory interface 300 may be a dynamic random access memory (DRAM) interface. An interface of a volatile memory, such as a DRAM, may exhibit a high transmission speed. Therefore, the buffer 210 of the memory interface 300 may exchange data with the host 100 at high speed. For example, the non-volatile memory device 200 may be a non-volatile dual in-line memory module (NVDIMM) that provides a DRAM interface. The memory interface 300 may be a DDR3 NVDIMM, a DDR4 NVDIMM, but is not limited thereto.

As described below, the buffer 210 may receive at least a portion of boot data 221 from the non-volatile memory 220 under the control of the non-volatile memory controller 230 and may store the boot data 221 in a desired (or, alternatively, a pre-set) region in correspondence to a pre-set address in the host 100. The desired (or, alternatively, the pre-set) address in the host 100 may be the address of a region accessed by the memory interface 300. Due to the memory interface 300 providing a high transmission speed, the host processor 110 may read out the boot data 211 from the buffer 210 at high speed, and thus a time taken to perform a boot process may be reduced.

According to an example embodiment, the buffer 210 is a memory capable of writing or reading out data faster than the non-volatile memory 220 and, for example, may include a volatile memory, such as a static random access memory (SRAM), a DRAM, a latch, a flip-flop, and a register, or a non-volatile memory, such as a NAND flash memory, a vertical NAND (VNAND) flash memory, a NOR flash memory, a resistive random access memory (RRAM), a phase change RAM (PRAM), a magnetoresistive RAM (MRAM), a ferroelectric RAM (FRAM), and a spin transfer torque RAM (STT-RAM). Hereinafter, for convenience of explanation, the buffer 210 is described as a DRAM supporting a DRAM interface. However, example embodiments of the inventive concepts are not limited thereto.

The non-volatile memory 220 may refer to a memory or a memory device that retains data stored therein even if power supply is stopped. Therefore, even if power supplied to the non-volatile memory 220 is blocked, data stored in the non-volatile memory 220 may be retained. For example, the non-volatile memory 220 may be a NAND flash memory, a VNAND flash memory, a NOR flash memory, a RRAM, a PRAM, a MRAM, a FRAM, or a STT-RAM, but is not limited thereto. The non-volatile memory device 200 may be embodied to have a three-dimensional (3D) array structure. Furthermore, instead of a semiconductor memory device, the non-volatile memory 220 may be embodied as a magnetic disk device. Example embodiments of the inventive concepts may be applied not only to a flash memory having a charge trapping layer including a conductive floating gate, but also to a charge trap flash (CTF) having a charge trapping layer including an insulation film.

As shown in FIG. 1, the non-volatile memory 220 may include the boot data 221. The boot data 221 includes data necessary for booting a system. For example, the boot data 221 may include setting data regarding devices included in the host 100 or devices communicably connected to the host 100. Since the boot data 221 includes data required by a boot process, the boot data 221 may be stored in the non-volatile memory 220, where the host processor 110 may normally boot a system including the host 100 and the non-volatile memory device 200 by executing or referring to the boot data 221 at the beginning of a boot process.

As shown in FIG. 1, the host 100 may be communicably connected to the buffer 210 of the non-volatile memory device 200. The buffer 210 may receive a command, an address, and/or data from the host 100 (or the host processor 110) via the memory interface 300. For example, the buffer 210 may receive a boot data request command from the host processor 110 and transmit the boot data 211 to the host 100.

As shown in FIG. 1, the non-volatile memory controller 230 of the non-volatile memory device 200 is communicably connected to the non-volatile memory 220 and the buffer 210. The non-volatile memory controller 230 may read out data stored in the buffer 210 or write data to the buffer 210 by controlling the buffer 210. Furthermore, the non-volatile memory controller 230 may read out data stored in the non-volatile memory 220 or write data to the non-volatile memory 220 by controlling the non-volatile memory 220. For example, the non-volatile memory controller 230 may read out at least a portion of the boot data 221 stored in the non-volatile memory 220. The non-volatile memory controller 230 may write the at least some of the boot data 221 read out from the non-volatile memory 220 (e.g., the boot data 211) to the buffer 210.

Although FIG. 1 shows that the buffer 210, the non-volatile memory 220, and the non-volatile memory controller 230 as independent components, it is merely an example, and two or more of the buffer 210, the non-volatile memory 220, and the non-volatile memory controller 230 may be embodied as a single hardware component. Furthermore, the non-volatile memory controller 230 may be an independent processor or a digital circuit including a plurality of logic gates.

Figure 2:
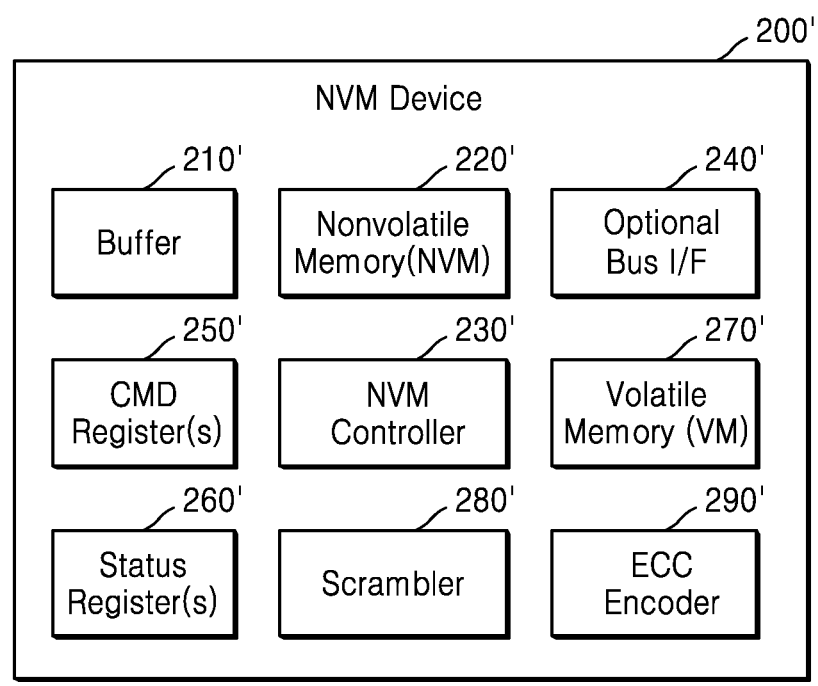
FIG. 2 is a block diagram of a modified example of the non-volatile memory device of FIG. 1, according to an example embodiment.

FIG. 2 is a block diagram of a modified example 200' of the non-volatile memory device 200 of FIG. 1, according to an example embodiment.

As shown in FIG. 2, the non-volatile memory device 200' may include a buffer 210', a non-volatile memory 220', a non-volatile memory controller 230', a bus interface block 240', a command register 250', a status register 260', a volatile memory 270', a scrambler 280', and an error correcting code (ECC) encoder 290'. The buffer 210', the non-volatile memory 220', and the non-volatile memory controller 230' may perform functions identical or similar to those of the corresponding components in the embodiment shown in FIG. 1.

The bus interface block 240' may be communicably connected to the command register 250' and the status register 260'. The bus interface block 240' may provide a communication channel to the host 100 of FIG. 1. In other words, referring to FIG. 1, the non-volatile memory device 200 may communicate with the host 100 not only via a channel provided by the memory interface 300, but also via a channel provided by the bus interface block 240'. The host 100 and the bus interface block 240' may communicate with each other via a bus different from a bus for the memory interface 300 connected to the buffer 210'. For example, the bus interface block 240' may support a system management bus (SMBus).

The command register 250' may be accessed by the host 100 via the memory interface 300 or the bus interface block 240' and may be directly accessed by the non-volatile memory controller 230'. The command register 250' may store a command received from the host 100. A command received from the host 100 may include a write command and a read command and may include a boot data request.

The status register 260' may be accessed by the host 100 via the memory interface 300 or the bus interface block 240' and may be directly accessed by the non-volatile memory controller 230'. The non-volatile memory controller 230' may store data in the status register 260', and the host 100 may read out data stored in the status register 260'. For example, the non-volatile memory controller 230' may store boot data ready in the status register 260', and the host 100 may read out the boot data ready stored in the status register 260'.

The volatile memory 270' may store boot data or data obtained by processing boot data under the control of the non-volatile memory controller 230'. For example, as described below with reference to FIG. 3, the volatile memory 270' may provide a storage space for the scrambler 280' or the ECC encoder 290'. To this end, the volatile memory 270' may be connected to the non-volatile memory controller 230' and may be communicably connected to the scrambler 280' and/or the ECC encoder 290'. For example, the volatile memory 270' may refer to a SRAM, a DRAM, a latch, a flip-flop, or a register, but is not limited thereto. Although the memory 270' has been described above as a volatile memory 270', example embodiments of the inventive concepts are not limited thereto. That is, the volatile memory 270' may perform a same function even if the volatile memory 270' is replaced with a non-volatile memory, such as a NAND flash memory, a VNAND flash memory, a NOR flash memory, a RRAM, a PRAM, a MRAM, a FRAM, or a STT-RAM.

The scrambler 280' may be a logic element or a circuit that employs an algorithm for randomizing a transmitted code sequence based on, for example, an exclusive OR operation between an original code sequence to be transmitted and a random signal. The scrambler 280' may communicate with the volatile memory 270' and may write data to the volatile memory 270' or may read out data stored in the volatile memory 270'. Furthermore, the scrambler 280' may communicate with the buffer 210' and may write data to the buffer 210' or may read out data stored in the buffer 210'.

The scrambler 280' may randomize boot data included in the volatile memory 270' and write the randomized boot data to the buffer 210'. Since boot data may be encrypted by the scrambler 280', security thereof may be improved, and the integrity of signals transmitted via the memory interface 300 may be improved. Scrambled boot data may be descrambled by a descrambler that may be included in the host 100.

The ECC encoder 290' may be a logic device or a circuit that adds a code for correcting an error that may occur in data. For example, the ECC encoder 290' may generate and add a parity bit, thereby performing encoding for correcting an error in the data. The ECC encoder 290' may communicate with the volatile memory 270' and may write data to the volatile memory 270' or may read out data stored in the volatile memory 270'. Furthermore, the ECC encoder 290' may communicate with the buffer 210' and may write data to the buffer 210' or read out data stored in the buffer 210'. Therefore, the ECC encoder 290' may check and correct an error of boot data stored in the volatile memory 270', thereby improving reliability of the non-volatile memory device 200'.

In some example embodiments, the NVM controller 230' may execute instructions that configure the NVM controller 230' to perform the functions of the scrambler 280' and/or the ECC encoder 290'.

Figure 3:
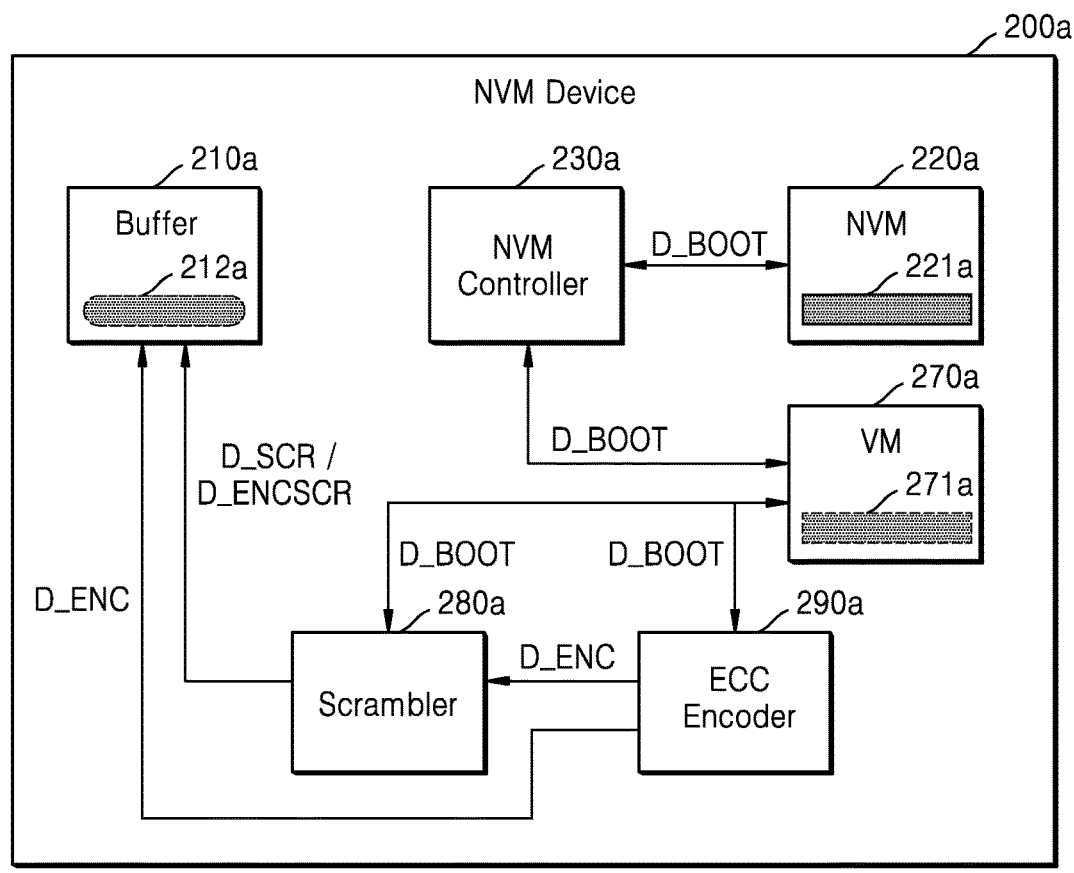
FIG. 3 is a block diagram of a non-volatile memory device according to an example embodiment.

FIG. 3 is a block diagram of a non-volatile memory device 200a according to an embodiment. Hereinafter, operations of a scrambler 280a and an ECC encoder 290a will be described with reference to FIG. 3. Although FIG. 3 shows that the non-volatile memory device 200a includes both the scrambler 280a and the ECC encoder 290a, the non-volatile memory device 200a may include just one of either the scrambler 280a or the ECC encoder 290a, according to some example embodiments.

Referring to FIG. 3, the non-volatile memory controller 230a may receive boot data D_BOOT from a non-volatile memory 220a and write the boot data D_BOOT to a volatile memory 270a. Furthermore, the volatile memory 270a may temporarily store boot data 271a.

The scrambler 280a may read out the boot data D_BOOT from the volatile memory 270a and scramble the boot data D_BOOT. The scrambler 280a may write scrambled boot data D_SCR to a buffer 210a.

Similar to the scrambler 280a, the ECC encoder 290a may read out boot data D_BOOT from the volatile memory 270a based on a read-out command and encode the boot data D_BOOT. The ECC encoder 290a may write encoded boot data D_ENC to the buffer 210a. Furthermore, the ECC encoder 290a may transmit the encoded boot data D_ENC to the scrambler 280a. In some example embodiments, the scrambler 280a may write encoded and scrambled boot data D_ENCSCR to the buffer 210a rather than the scrambled boot data D_SCR.

Figure 4A:
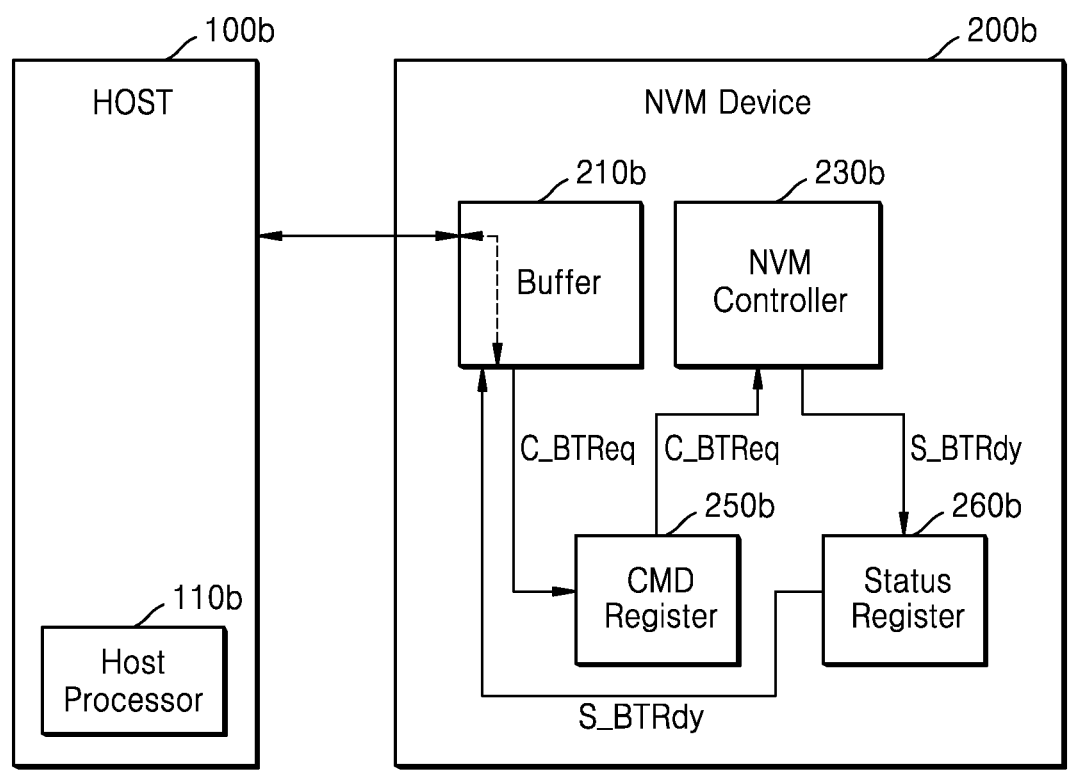
FIG. 4A is a block diagram of a memory according to an example embodiment.
Figure 4B:
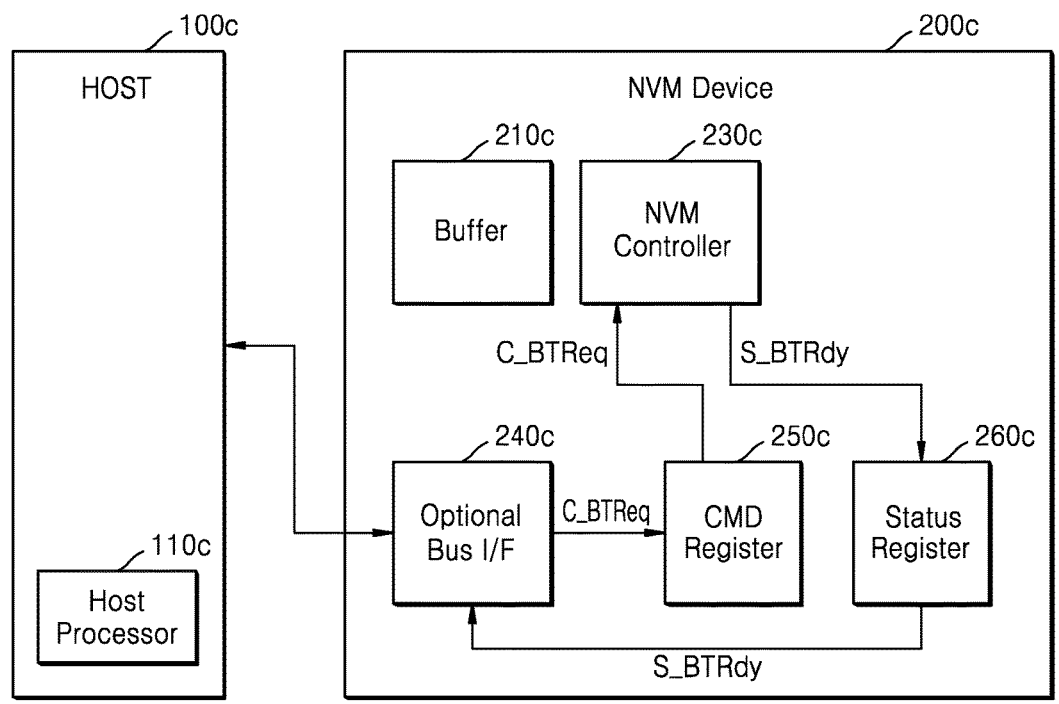
FIG. 4B is a block diagram of a memory according to an example embodiment.

FIGS. 4A and 4B are block diagrams of memory devices according to example embodiments.

In detail, FIG. 4A is a block diagram for describing an example that a host processor 110b accesses a command register 250b and/or a status register 260b via a buffer 210b, whereas FIG. 4B is a block diagram for describing an example that a host processor 110c accesses a command register 250c and/or a status register 260c via a bus interface block 240c.

Referring to FIGS. 2 and 4A, as described above with reference to FIG. 2, the command register 250b may be accessed by a host 100b (or the host processor 110b) and a non-volatile memory controller 230b.

For example, as shown in FIG. 4A, the host 100b may write a boot data request C_BTReq to the command register 250b via a bus connected to the buffer 210b. The non-volatile memory controller 230b may read out the boot data request C_BTReq stored in the command register 250b, thereby controlling an operation for transmitting boot data to the host 100b.

As described above with reference to FIG. 2, the status register 260b may be accessed by the host 100b (or the host processor 110b) and the non-volatile memory controller 230b. For example, the non-volatile memory controller 230b may write a boot data ready S_BTRdy to the status register 260b. The host 100b may read out the boot data ready S_BTRdy stored in the status register 260b via a bus connected to the buffer 210b.

FIG. 4B is a block diagram showing that a host 100c accesses the command register 250c and/or the status register 260c via a separate bus, that is, the bus interface block 240c instead of the buffer 210b.

As shown in FIG. 4B, the host 100c may write a boot data request C_BTReq to the command register 250c via the bus interface block 240c. A non-volatile memory controller 230c may read out the boot data request C_BTReq stored in the command register 250c.

Furthermore, according to an example embodiment as shown in FIG. 4B, the non-volatile memory controller 230c may write a boot data ready S_BTRdy to the status register 260c. The host 100c may read out the boot data ready S_BTRdy stored in the status register 260c via the bus interface block 240c.

Although FIGS. 4A and 4B show the operations related to the command register 250b or 250c and the status register 260b or 260c as different operations, the two operations may be successively performed. For example, the host 100b or 100c may store a boot data request C_BTReq in the command register 250b or 250c and, when a boot data ready S_BTRdy is written to the status register 260b or 260c after the non-volatile memory controller 230b or 230c completes loading boot data to the buffer 210b or 210c, the host processor 110b or 110c may recognize completion of loading of the boot data by reading out the boot data ready S_BTRdy stored in the status register 260b or 260c and may be booted by using the boot data written to the buffer 210b or 210c.

Figure 5:
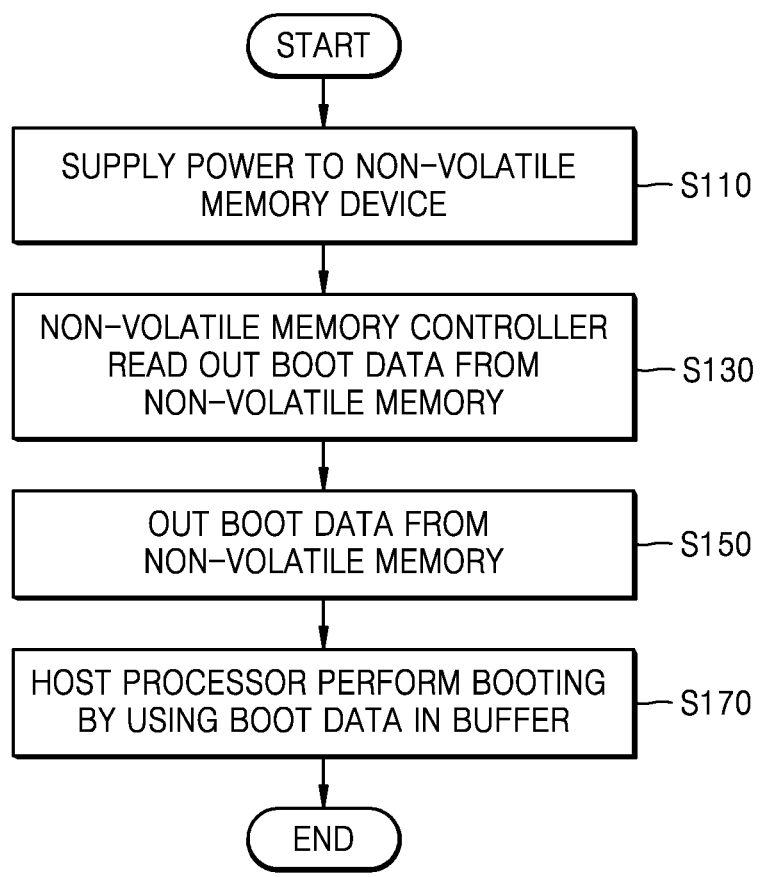
FIG. 5 is a flowchart of a method of operating a memory device, according to an example embodiment.

FIG. 5 is a flowchart of a method of operating a memory device, according to an example embodiment.

Referring to FIGS. 1 and 5, in operation S110, the non-volatile memory device 200 may be powered.

In operation S130, the non-volatile memory controller 230 may read out boot data, which is stored in the non-volatile memory 220 in advance, from the non-volatile memory 220.

In operation S150, the non-volatile memory controller 230 may load the boot data to the buffer 210.

In operation S170, the host processor 110 may proceed with a booting operation using the boot data loaded to the buffer 210.

Figure 6A:
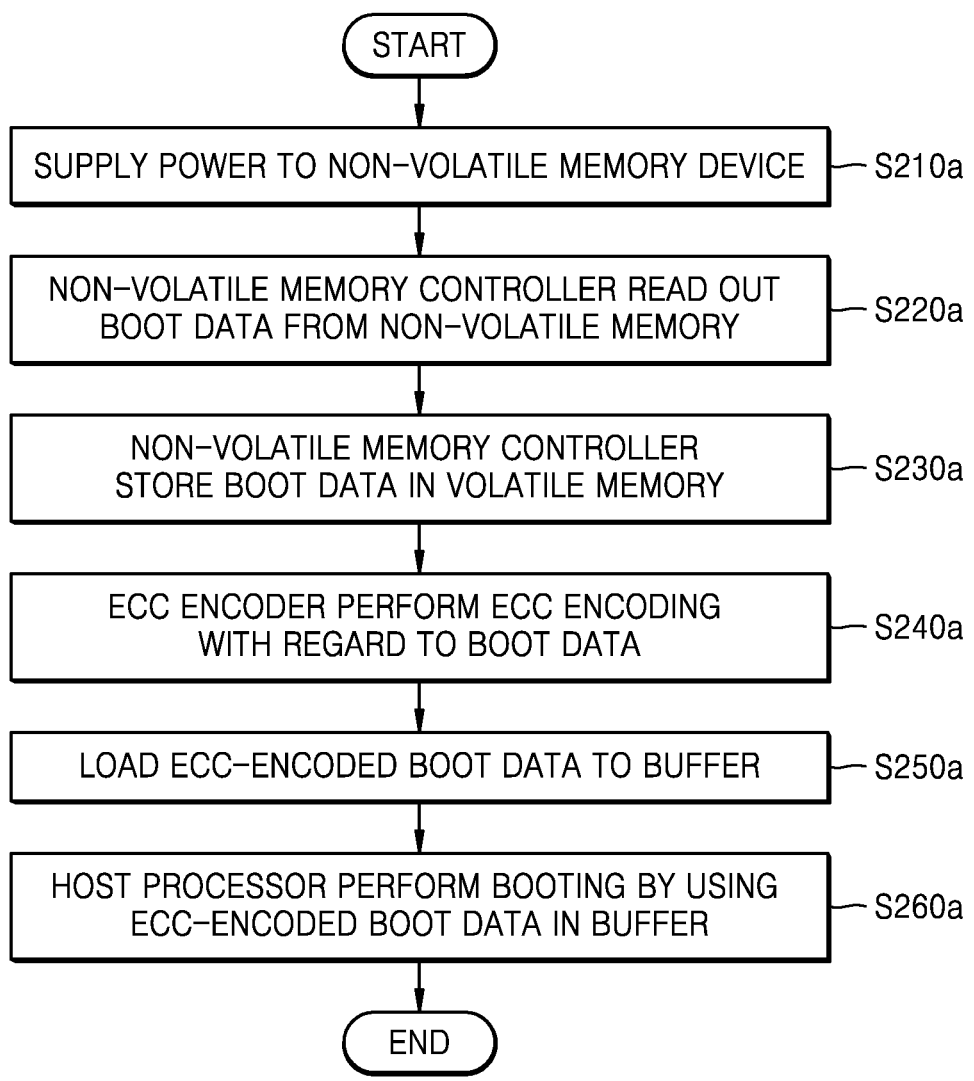
FIGS. 6A and 6B are flowcharts of methods of operating the non-volatile memory device of FIG. 3, according to example embodiments.
Figure 6B:
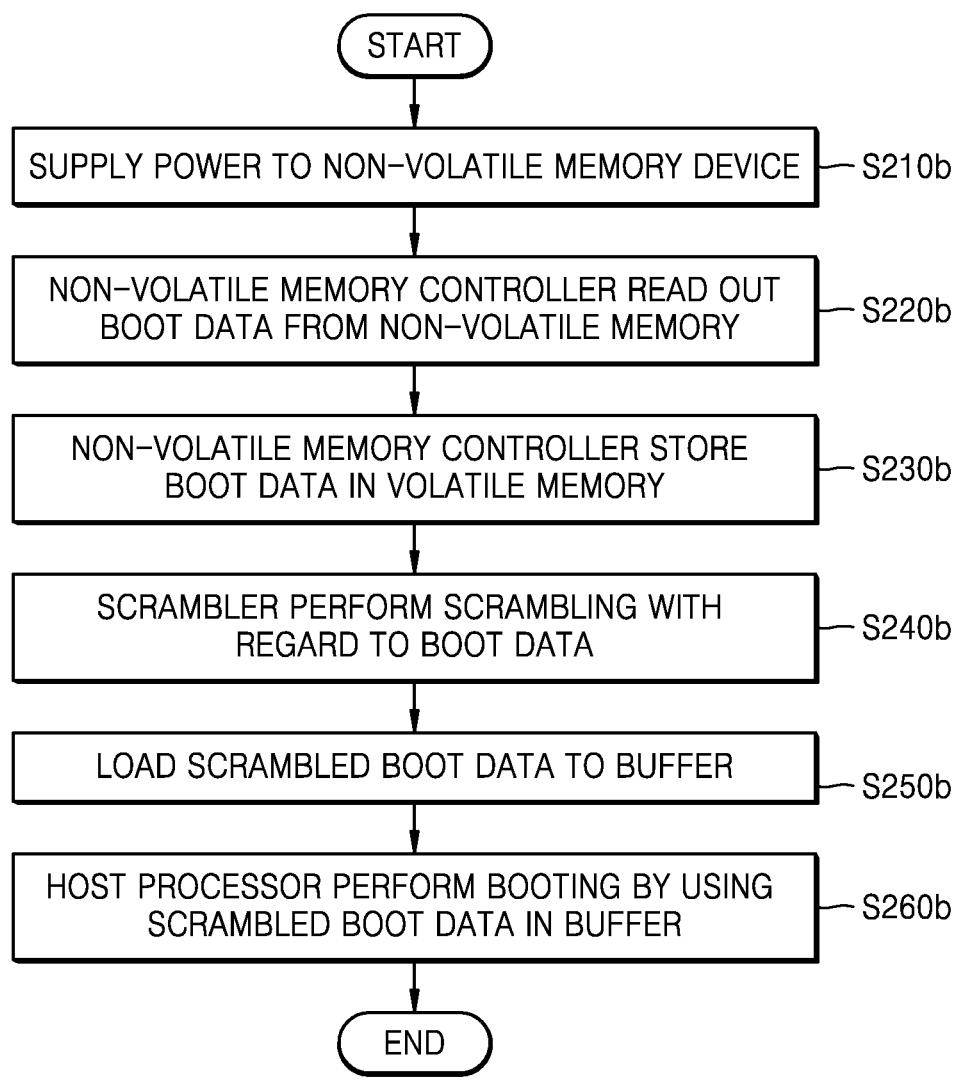

FIGS. 6A and 6B are flowcharts of methods of operating the non-volatile memory device 200a of FIG. 3, according to example embodiments. In detail, FIG. 6A shows an operation of a memory device including the ECC encoder 290a of FIG. 3, whereas FIG. 6B shows an operation of a memory device including the scrambler 280a of FIG. 3.

Referring to FIGS. 3 and 6A, in operation S210a, the non-volatile memory device 200a may be powered.

In operation S220a, the non-volatile memory controller 230a may read out boot data from the non-volatile memory device 200a.

Next, in operation S230a, for ECC encoding, the non-volatile memory controller 230a may write the boot data to the volatile memory 270a. In operation S240a, the ECC encoder 290a may read out the boot data written to the volatile memory 270a and encode the boot data. In operation S250a, the ECC encoder 290a may write encoded boot data to the buffer 210a.

Next, in operation S260a, the host processor 110 may perform a booting operation by using the encoded boot data written to the buffer 210a.

Referring to FIG. 6B, in operation S210b, the non-volatile memory device 200a may be powered.

In operation S220b, the non-volatile memory controller 230a may read out boot data from the non-volatile memory device 200a.

Next, to perform scrambling, in operation S230b, the non-volatile memory controller 230a may write the boot data to the volatile memory 270a. In operation S240b, the scrambler 280a may read out the boot data written to the volatile memory 270a and scramble the boot data. In operation S250b, the scrambler 280a may write scrambled boot data to the buffer 210a.

Next, in operation S260b, the host processor 110 may perform a booting operation by using the scrambled boot data written to the buffer 210a.

Although FIGS. 6A and 6B show the ECC encoding and the scrambling as two different operations for convenience of explanation, the two operations may be successively performed as described above with reference to FIG. 3. For example, boot data that is input to the volatile memory 270a, encoded by the ECC encoder 290a, and scrambled by the scrambler 280a may be written to the buffer 210a.

Figure 7:
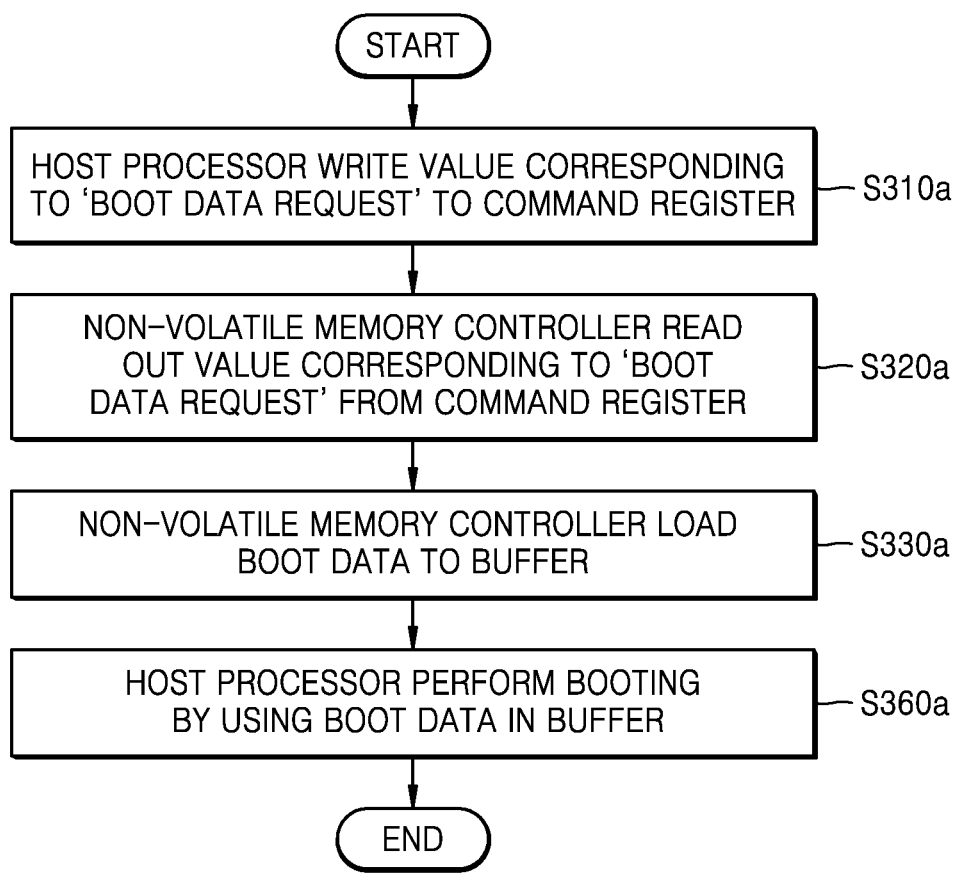
FIGS. 7 and 8 are flowcharts of methods of operating the memory devices of FIGS. 4A and 4B, according to an example embodiment.

FIG. 7 is a flowchart of a method of operating the memory devices of FIGS. 4A and 4B, according to an example embodiment.

In detail, FIG. 7 shows operations of the non-volatile memory devices 200b and 200c respectively including the command register 250b and 250c. As described above with reference to FIGS. 4A and 4B, the host processor 110b and 110c may access the command register 250b and 250c via the buffer 210b and 210c or via the bus interface block 240c.

Referring to FIGS. 4A, 4B and 7, in operation S310a, the host processor 110b may write a 'boot data request' to the command register 250b.

In operation S320a, the non-volatile memory controller 230b may read out the 'boot data request' from the command register 250b.

In operation S330a, the non-volatile memory controller 230b may recognize that the host 100b requests boot data and may write the boot data to the buffer 210b in response to the 'boot data request'.

Next, in operation S360a, the host processor 110b may perform a booting operation using the boot data written to the buffer 210b.

Figure 8:
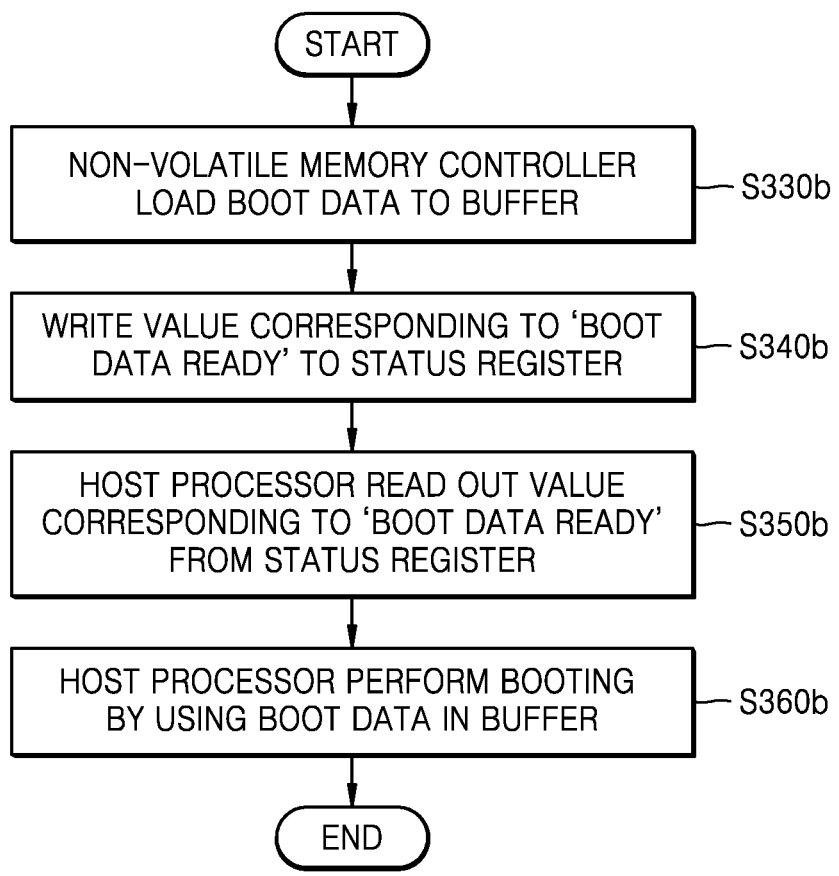

FIG. 8 is a flowchart of a method of operating the memory devices of FIGS. 4A and 4B, according to an example embodiment.

In detail, FIG. 8 shows operations of the non-volatile memory devices 200b and 200c respectively including the status registers 260b and 260c. As described above with reference to FIGS. 4A and 4B, the host processor 110b and 110c may access the status registers 260b and 260c via the buffer 210b and 210c or via the bus interface block 240c.

Referring to FIGS. 4A, 4B and 8, in operation S330b, the non-volatile memory controller 230b may write boot data to the buffer 210b.

In operation S340b, the non-volatile memory controller 230b may write a 'boot data ready' to the status register 260b.

In operation S350b, the host processor 110b may read out the 'boot data ready' from the status register 260b.

Therefore, the host 100b may recognize that boot data is prepared by the non-volatile memory controller 230b, and thus, in operation S360b, the host processor 110b may perform a booting operation by using the boot data loaded to the buffer 210b.

Figure 9:
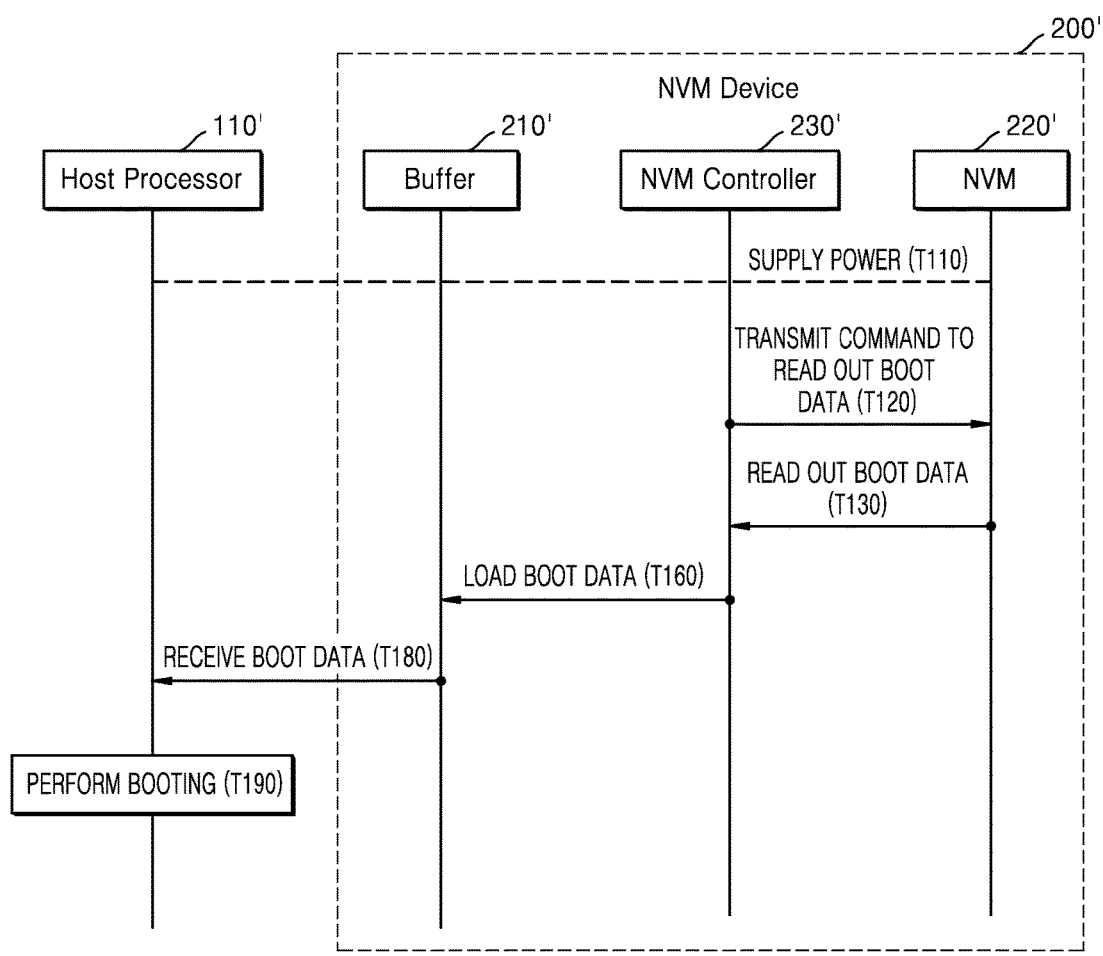
FIG. 9 is a diagram showing operations, performed over time, between a host processor and a non-volatile memory device.

FIG. 9 is a diagram showing operations, performed over time, between a host processor and a non-volatile memory device.

In detail, FIG. 9 shows data flows that occur over time between the host processor 110 of FIG. 1 and the buffer 210', the non-volatile memory controller 230', and the non-volatile memory 220' included in the non-volatile memory device 200' of FIG. 2.

Referring to FIGS. 2 and 9, in operation T110, the non-volatile memory device 200' is powered.

In operation T120, the non-volatile memory controller 230' may transmit a boot data read-out command to the non-volatile memory 220'.

In operation T130, the non-volatile memory controller 230' may read out boot data stored in the non-volatile memory 220'.

In operation T140, the non-volatile memory controller 230' may transmit a boot data write command and boot data to the buffer 210', thereby writing the boot data to the buffer 210'.

In operation T180, a host processor 110' may receive the boot data from the buffer 210' (operation T180) and, in operation T190, the host processor 110' may perform a booting operation using the boot data.

Figure 10:
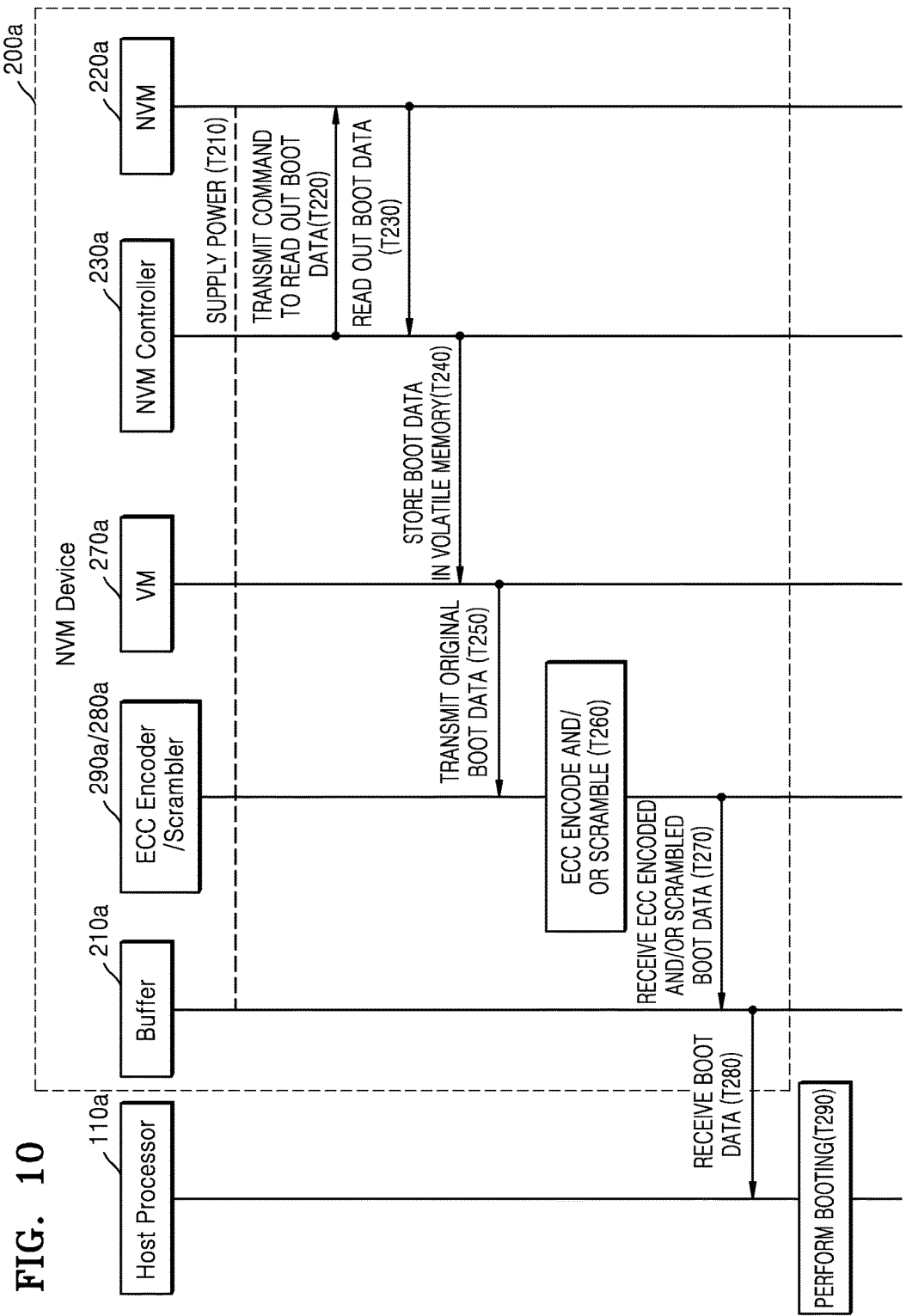
FIG. 10 is a diagram showing operations, performed over time, between a host processor and a non-volatile memory device according to an example embodiment.

FIG. 10 is a diagram showing operations, performed over time, between a host processor and a non-volatile memory device according to an embodiment.

In detail, FIG. 10 is a diagram showing operations, performed over time, between the host processor 110 of FIG. 1 and the buffer 210a, the non-volatile memory controller 230a, the non-volatile memory 220a, the volatile memory 270a, the ECC encoder 290a, and the scrambler 280a included in the non-volatile memory device 200a of FIG. 3, according to an embodiment.

Referring to FIGS. 3 and 10, in operation T210, the memory device 200a is powered.

In operation T220, the non-volatile memory controller 230a may transmit a boot data read-out command to the non-volatile memory 220a.

In operation T230, the non-volatile memory controller 230a may read out boot data stored in the non-volatile memory 220a.

In operation T240, the non-volatile memory controller 230a may store the boot data in the volatile memory 270a.

In operation T250, the non-volatile memory controller 230a may transmit a boot data write command and the boot data read out from the non-volatile memory 220a to the volatile memory 270a.

The ECC encoder 290a and the scrambler 280a may receive original boot data from the volatile memory 270a. Here, the ECC encoder 290a and the scrambler 280a may transmit read-out commands to the volatile memory 270a and receive the boot data.

In operation T260, the ECC encoder 290a may perform ECC encoding with regard to the received boot data. Further, the scrambler 280a may scramble the received boot data. As described above, the ECC encoding and the scrambling may be performed successively or independently.

In operation T270, the ECC encoder 290a and the scrambler 280 may write ECC encoded and/or scrambled boot data to the buffer 210a, respectively. Here, the ECC encoder 290a and the scrambler 280a may transmit a write command and processed boot data to the buffer 210a.

Next, in operations T280 and T290, a host processor 110a may receive boot data loaded to the buffer 210a and perform a booting operation. Here, as described above, the host processor 110a may transmit a read-out command to the buffer 210a, may receive boot data, and may descramble scrambled data by using a descrambler included in a host.

Figure 11:
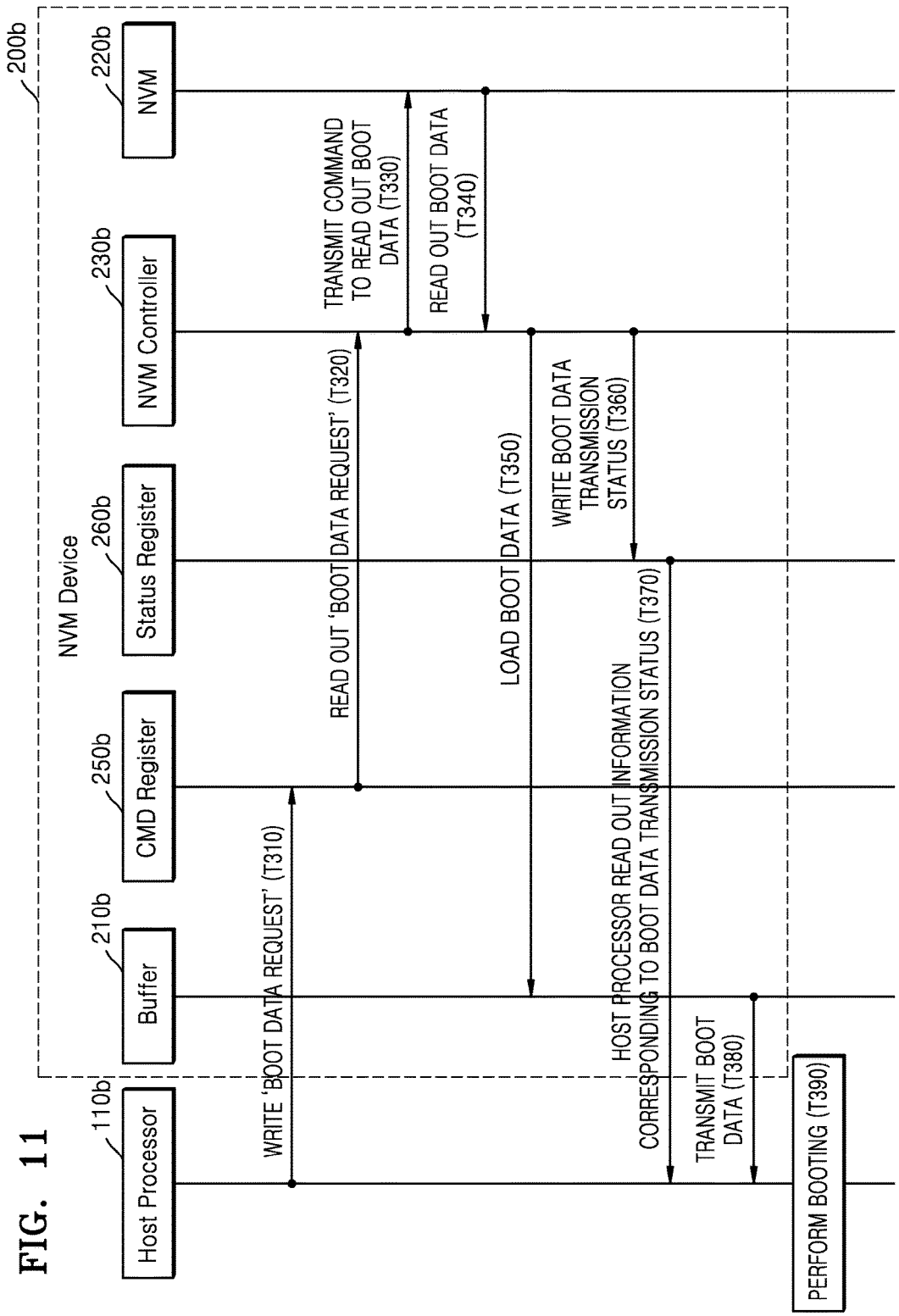
FIG. 11 is a diagram showing operations, performed over time, between a host processor and a non-volatile memory device according to an example embodiment.

FIG. 11 is a diagram showing operations, performed over time, between a host processor and a non-volatile memory device according to an example embodiment.

In detail, FIG. 11 is a diagram showing operations, performed over time, between the host processors 110b and 110c of FIGS. 4A and 4B and the buffers 210b and 210c, the non-volatile memory controllers 230b and 230c, the non-volatile memories 220b and 220c, the command registers 250b and 250c, and the status registers 260b and 260c included in the non-volatile memory devices 200b and 200c of FIGS. 4A and 4B, according to an embodiment.

Referring to FIGS. 4A and 11, in the non-volatile memory device 200b, boot data may be stored in the buffer 210b according to a command from the host processor 110b.

In operation T310, the host processor 110b may write 'boot data request' to the command register 250b of the non-volatile memory device 200b. Here, as described above with reference to FIGS. 4A and 4B, the host processor 110b may access the command register 250b via the buffer 210b or the bus interface block 240c of FIG. 4. Furthermore, the host processor 110b may store the 'boot data request' in the command register 250b, thereby requesting boot data to the non-volatile memory device 200b or the non-volatile memory controller 230b.

In operation T320, the non-volatile memory controller 230b may read out the 'boot data request' stored in the command register 250b.

In operation T330, in response to the 'boot data request,' the non-volatile memory controller 230b may transmit a boot data read-out command to the non-volatile memory 220b.

In operation T340, the non-volatile memory controller 230b may read out boot data from the non-volatile memory 220b.

In operation T350, the non-volatile memory controller 230b may load the read-out boot data to the buffer 210b.

When the non-volatile memory controller 230b completes loading the boot data to the buffer 210b, in operation T360, the non-volatile memory controller 230b may write information indicating that transmission of the boot data is completed to the status register 260b. The information may be written as the non-volatile memory controller 230b transmits a 'boot data ready' and a write command to the status register 260b.

Next, in operation T370, the host processor 110b may access the status register 260b and read out data corresponding to the 'boot data ready'. Here, as described above with reference to FIGS. 4A and 4B, the host processor 110b may access the status register 260b or 260c via the buffer 210b or 210c or may access the status register 260b or 260c via the bus interface block 240c. Furthermore, the host processor 110b may read out the 'boot data ready' from the status register 260b.

When the 'boot data ready' is read out, in operation T380, the host processor 110b may transmit a read-out command to the buffer 210b and receive boot data from the buffer 210b.

In operation T390, the host processor 110b may perform a booting operation using the received boot data.

According to an example embodiment, a non-volatile memory device may include the ECC encoder 290a and/or the scrambler 280a of FIG. 3 and the command register 250b and/or the status register 260b of FIG. 4A.

Referring to FIG. 2, a host may request boot data via the command register 250' and, when, the non-volatile memory controller 230' receives the boot data from the non-volatile memory 220' and writes the boot data to the volatile memory 270' based on the request, the boot data may be ECC encoded by the ECC encoder 290', scrambled by the scrambler 280', and written to the buffer 210'. When the scrambler 280' finishes writing the boot data, the non-volatile memory controller 230' may indicate boot data preparation status via the status register 260', and then the host processor 110' may perform a booting operation by using the boot data.

Figure 12:
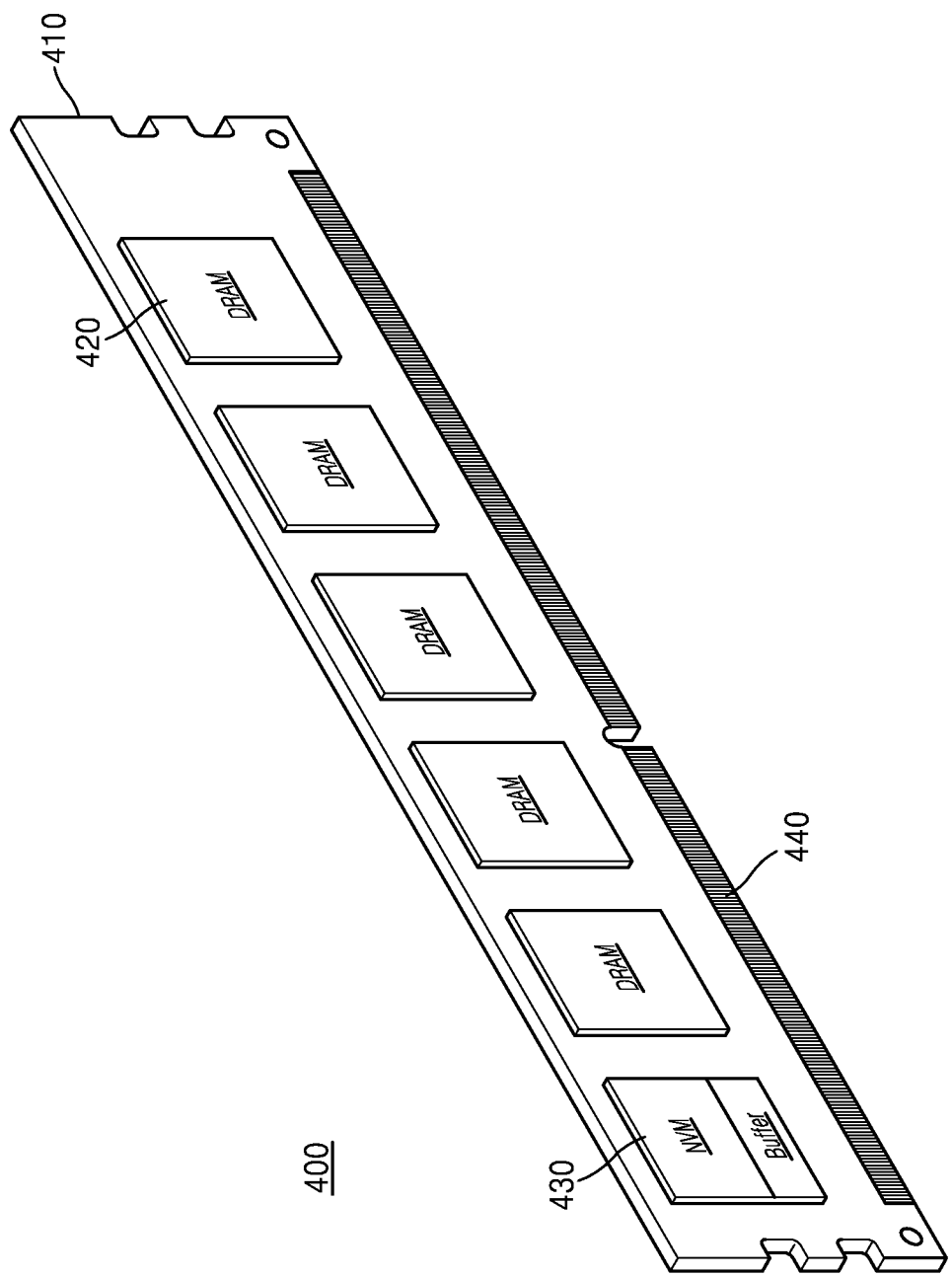
FIG. 12 is a diagram showing a memory module including a non-volatile memory device, according to an example embodiment.

FIG. 12 is a diagram showing a memory module 400 including a non-volatile memory device, according to an example embodiment.

Referring to FIG. 12, the memory module 400 may be applied to a single in-line memory module (SIMM), a dual in-line memory module (DIMM), a small-outline DIMM (SODIMM), an unbuffered DIMM (UDIMM), a fully-buffered DIMM (FBDIMM), a rank-buffered DIMM (RB-DIMM), a load-reduced DIMM (LRDIMM), a non-volatile DIMM (NVDIMM), a mini-DIMM, a micro-DIMM, etc.

As shown in FIG. 12, the memory module 400 may include a printed circuit board 410, a plurality of memory chips 420, a non-volatile memory device 430, and a connector 440. The plurality of memory chips 420 and the non-volatile memory device 430 may communicate with a memory controller outside the memory module 400 via the connector 440.

Each of the plurality of memory chips 420 is a memory device and may include a volatile memory, such as a static random access memory (SRAM), a DRAM, a latch, a flip-flop, and a register. Although it is described below that each of the memory chips 420 includes a DRAM, example embodiments of the inventive concepts are not limited thereto.

The non-volatile memory device 430 may include a non-volatile memory and a buffer. The non-volatile memory may store boot data used by a host (or a host processor) accessing the memory module 400 during a booting operation in a non-volatile manner. The buffer may provide a same interface as those of the memory chips 420 and may be accessed by the host. At the beginning of a booting operation, boot data stored in the non-volatile memory device 430 may be loaded to the buffer by a non-volatile memory controller (not shown), and the host may receive the boot data stored in the buffer via a same interface as those of the memory chips 420 via the connector 440.

While example embodiments of the inventive concepts have been particularly shown and described with reference to some example embodiments thereof, it will be understood that various changes in form and details may be made therein without departing from the spirit and scope of the following claims.

What is claimed is:

1. A memory device comprising:
a first memory configured to store boot data, the first memory being a nonvolatile memory device;
a second memory configured to temporarily store the boot data from the first memory, the second memory being a first volatile memory;
a controller configured to at least one of scramble or encode the boot data stored in the second memory;
a buffer including a second volatile memory, the buffer configured to receive the scrambled and/or encoded boot data, and transfer the scrambled and/or encoded boot data to a host via a volatile memory interface, the volatile memory interface being an interface configured to support communication between the second volatile memory and the host; and
wherein the controller is further configured to control transmission of the boot data between the first memory, the second memory, and the buffer in response to a command from the host.

2. The memory device of claim 1, further comprising:
a command register configured to store the command received from the host.

3. The memory device of claim 1, further comprising:
a status register configured to store data corresponding to a status of transmission of the boot data to the buffer.

4. The memory device of claim 3, wherein the buffer is configured to facilitate communication between the status register and the host.

5. The memory device of claim 3, further comprising:
a bus interface block configured to provide a communication channel between the status register and the host such that the bus interface block facilitates communication between the status register and the host.

6. The memory device of claim 1, wherein:
the second memory is separate from the buffer.

7. The memory device of claim 1, further comprising:
the second memory is configured to support the volatile memory interface.

8. The memory device of claim 7, wherein the second memory comprises:
a dynamic random access memory (DRAM).

9. A memory module comprising:
at least one volatile memory chip configured to communicate via a volatile memory interface, the volatile memory interface being an interface configured to support communication between the at least one volatile memory chip and a host; and
a memory device chip including,
a first memory configured to store boot data, the first memory being a nonvolatile memory, and
a second memory configured to temporarily store the boot data from the first memory, the second memory being a first volatile memory,
a controller configured to at least one of scramble or encode the boot data stored in the second memory, and
a buffer including a second volatile memory, the buffer configured to receive the scrambled and/or encoded boot data, and transfer the scrambled and/or encoded boot data to the host via the volatile memory interface,
wherein the controller is further configured to control transmission of the boot data between the first memory, the second memory, and the buffer.

10. The memory module of claim 9, wherein the controller is configured to load the boot data to the buffer based on a particular address in the volatile memory interface and a command from the host.

11. The memory module of claim 9, wherein the memory device chip further comprises:
a status register configured to store data corresponding to a status of transmission of the boot data to the buffer.

12. The memory module of claim 9, wherein the at least one volatile memory chip comprises:
a dynamic random access memory (DRAM).

13. A device configured to transfer boot data to a host device via a volatile memory interface, the device comprising:
a first memory configured to store boot data, the first memory being a nonvolatile memory device;
a second memory configured to temporarily store the boot data from the first memory, the second memory being a first volatile memory;
a controller configured to at least one of scramble or encode the boot data stored in the second memory;
a buffer including a second volatile memory, the buffer configured to support the volatile memory interface and transfer the scrambled and/or encoded boot data stored therein to the host device via the volatile memory interface, the volatile memory interface being an interface configured to support communication between the second volatile memory and the host device; and
wherein the controller is further configured to load the boot data from the first memory to the buffer via the second memory based on a command from the host device.

14. The device of claim 13, wherein the volatile memory interface is a Dynamic Random Access Memory (DRAM) interface.

15. The device of claim 13, wherein the controller is configured to store a signal in a status register after loading the boot data to the buffer, the signal indicating to the host device that loading of the boot data to the buffer is complete.

16. The memory module of claim 9, further comprising:
the second memory is configured to transfer the boot data to the buffer under a control of the controller.

\* \* \* \* \*